US011115268B2

(12) United States Patent
Yuan et al.

(10) Patent No.: US 11,115,268 B2
(45) Date of Patent: Sep. 7, 2021

(54) ASSISTANCE IN SERVICE PROVISION

(71) Applicant: International Business Machines Corporation, Armonk, NY (US)

(72) Inventors: Junfeng Yuan, San Jose, CA (US); Han Ying Song, Xian (CN); Ya Juan Dang, Beijing (CN); Xiao Wei Hou, Xi'an (CN); Shen Ming Tao, Changping (CN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/377,884

(22) Filed: Apr. 8, 2019

(65) Prior Publication Data

US 2020/0322214 A1    Oct. 8, 2020

(51) Int. Cl.
*H04L 12/24* (2006.01)
*H04L 29/08* (2006.01)
*H04L 12/911* (2013.01)

(52) U.S. Cl.
CPC .......... *H04L 41/0806* (2013.01); *H04L 47/82* (2013.01); *H04L 67/22* (2013.01)

(58) Field of Classification Search
CPC ...... H04L 41/0806; H04L 47/82; H04L 67/22
See application file for complete search history.

(56) References Cited

U.S. PATENT DOCUMENTS

| 9,003,231 | B1* | 4/2015 | Graves | G06F 11/1417 714/27 |
|---|---|---|---|---|
| 9,723,149 | B2 | 8/2017 | Meng | |
| 9,727,320 | B2* | 8/2017 | DeHaan | G06F 8/60 |
| 10,104,232 | B2 | 10/2018 | Marrelli | |
| 2004/0031030 | A1* | 2/2004 | Kidder | G06F 1/14 717/172 |
| 2008/0304445 | A1* | 12/2008 | Chou | H04L 47/824 370/329 |
| 2010/0002865 | A1 | 1/2010 | Kennedy | |
| 2010/0324961 | A1* | 12/2010 | Singh | G06Q 10/10 705/304 |
| 2012/0110186 | A1* | 5/2012 | Kapur | G06F 9/5072 709/226 |
| 2013/0097601 | A1* | 4/2013 | Podvratnik | G06F 8/61 718/1 |
| 2014/0156784 | A1* | 6/2014 | Buck | G06F 16/2379 709/217 |

(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — William G Trost, IV
*Assistant Examiner* — Monishwar Mohan
(74) *Attorney, Agent, or Firm* — Michael A. Petrocelli

(57) ABSTRACT

A method includes performing at least the following operations by one or more processors: receiving a request initiated by a device of a first user for a first service to be provisioned by a first entity, deriving a first user preference data based, at least in part, on a historical interaction information of the first user with a second entity provisioning a second service, and responsive to receiving the request, provisioning an instantiation of the first service, by the first entity, in a manner that is based, at least in part, on the first user preference data.

20 Claims, 7 Drawing Sheets

(56) References Cited

U.S. PATENT DOCUMENTS

| | | | |
|---|---|---|---|
| 2015/0365301 A1* | 12/2015 | Chatterjee | H04L 47/808 |
| | | | 709/226 |
| 2016/0212012 A1* | 7/2016 | Young | G06F 9/45558 |
| 2016/0248746 A1* | 8/2016 | James | H04L 9/3268 |
| 2016/0254943 A1* | 9/2016 | Maes | H04L 41/12 |
| | | | 709/224 |
| 2016/0269249 A1* | 9/2016 | Maes | H04L 41/5074 |
| 2016/0337175 A1* | 11/2016 | Rao | H04L 41/12 |
| 2017/0054848 A1* | 2/2017 | Meng | H04M 3/5233 |
| 2017/0063615 A1* | 3/2017 | Yang | H04L 41/5054 |
| 2017/0123617 A1* | 5/2017 | Zhao | G06F 16/50 |
| 2017/0140433 A1* | 5/2017 | Gopalan | G06N 20/00 |
| 2017/0149974 A1 | 5/2017 | Pickering | |
| 2017/0201850 A1* | 7/2017 | Raleigh | G06F 3/0482 |
| 2017/0286273 A1* | 10/2017 | Lau | G06F 11/3668 |
| 2017/0353744 A1* | 12/2017 | Kunisetty | H04N 21/26616 |
| 2018/0048532 A1* | 2/2018 | Poort | H04L 41/147 |
| 2018/0060066 A1* | 3/2018 | Rihani | G06F 8/71 |
| 2018/0191838 A1* | 7/2018 | Friedman | H04M 15/66 |
| 2018/0300398 A1* | 10/2018 | Moeller-Bertram | G06N 5/022 |
| 2019/0164087 A1* | 5/2019 | Ghibril | G06N 5/02 |
| 2019/0260642 A1* | 8/2019 | Maes | H04L 41/0893 |
| 2020/0007456 A1* | 1/2020 | Greenstein | H04L 47/70 |
| 2020/0177589 A1* | 6/2020 | Mangalvedkar | H04L 63/0876 |

* cited by examiner

ASSISTANCE IN SERVICE PROVISION

BACKGROUND

The present invention relates to the field of computer science, and more specifically, to a method, system and computer program product for assistance in service provision.

Nowadays, different types of services are available for users to access to related information they are interested in. Generally, different services are provisioned by service providers in different ways. A typical user behavior when looking for specific information is to search by themselves in related websites or at self-service terminals and retrieve information or answers provided automatically. If the users cannot find useful information or are not satisfied with information obtained in previous rounds of searches, they may turn to another service such as a call center for further help. In other typical situations, the same user may continue utilizing the same service for information searching after a period of time.

The term service (e.g., computer service) may generally relate to computer software or applications that deliver, for example, data processing services, Internet services, electronic mail services, electronic messaging services, or information or data stored in connection therewith.

SUMMARY

According to an embodiment of the present invention, a method includes performing at least the following operations by one or more processors: receiving a request initiated by a device of a first user for a first service to be provisioned by a first entity, deriving a first user preference data based, at least in part, on a historical interaction information of the first user with a second entity provisioning a second service, and responsive to receiving the request, provisioning an instantiation of the first service, by the first entity, in a manner that is based, at least in part, on the first user preference data.

According to another embodiment of the present invention, a computer system includes one or more processors, one or more computer-readable memories, one or more computer-readable tangible storage devices, and program instructions stored on at least one of the one or more storage devices for execution by at least one of the one or more processors via at least one of the one or more memories, the computer system is capable of performing a method including: receiving a request initiated by a device of a first user for a first service to be provisioned by a first entity, deriving a first user preference data based, at least in part, on a historical interaction information of the first user with a second entity provisioning a second service, and responsive to receiving the request, provisioning an instantiation of the first service, by the first entity, in a manner that is based, at least in part, on the first user preference data.

According to another embodiment of the present invention, a computer program product includes a computer readable non-transitory article of manufacture tangibly embodying computer readable instructions which, when executed, cause a computer to carry out a method including: receiving a request initiated by a device of a first user for a first service to be provisioned by a first entity, deriving a first user preference data based, at least in part, on a historical interaction information of the first user with a second entity provisioning a second service, and responsive to receiving the request, provisioning an instantiation of the first service, by the first entity, in a manner that is based, at least in part, on the first user preference data.

In a first aspect, one embodiment of the present invention provides a method. According to the method, it is detected, by one or more processors, that a request is initiated by a device for a first service to be provisioned by a first entity. In response to detecting the request, assistance information associated with a user of the device is obtained by one or more processors. The assistance information indicates at least a user preference, and the user preference is derived from historical interaction information of the user with a second entity provisioning a second service. The assistance information is provided by one or more processors to the first entity to assist the first entity in provisioning the first service in response to the request.

In a second aspect, another embodiment of the present invention provides a method. According to the method, a request initiated by a device is received by one or more processors for a first service to be provisioned by a first entity. Assistance information associated with a user of the device is received. The assistance information indicates at least a user preference, and the user preference is derived from historical interaction information of the user with a second entity provisioning a second service. The request is responded by provisioning the first service based on the assistance information.

In a third aspect, a further embodiment of the present invention provides a system. The system includes a processing unit; and a memory coupled to the processing unit and storing instructions thereon. The instructions, when executed by the processing unit, perform the method according to the above first aspect.

In a fourth aspect, a further embodiment of the present invention provides a system. The system includes a processing unit; and a memory coupled to the processing unit and storing instructions thereon. The instructions, when executed by the processing unit, perform the method according to the above second aspect.

In a fifth aspect, a further embodiment of the present invention provides a computer program product. The computer program product is tangibly stored on non-transient machine-readable medium and includes machine-executable instructions. The machine-executable instructions, when executed on a device, cause the device to perform the method according to the above first aspect.

In a sixth aspect, a further embodiment of the present invention provides a computer program product. The computer program product is tangibly stored on non-transient machine-readable medium and includes machine-executable instructions. The machine-executable instructions, when executed on a device, cause the device to perform the method according to the above second aspect

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
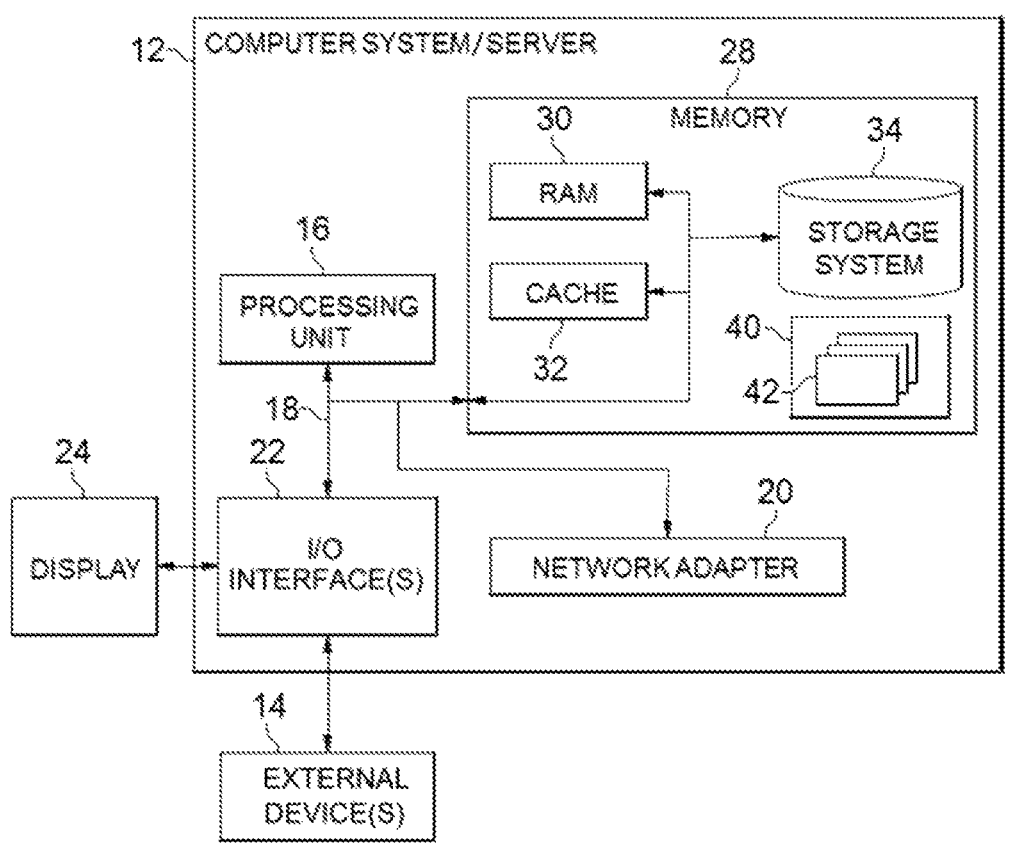
FIG. 1 depicts a cloud computing node, according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
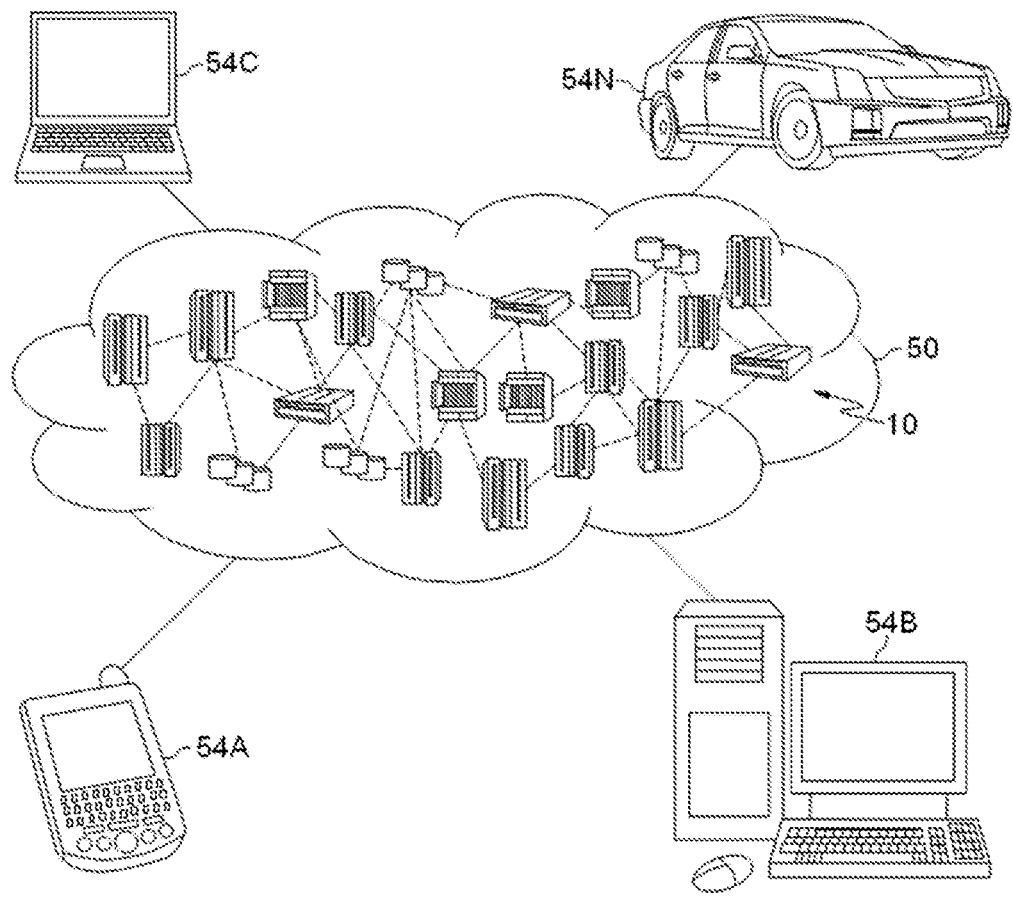
FIG. 2 depicts a cloud computing environment, according to an embodiment of the present invention.

Referring now to FIG. 2, illustrative cloud computing environment 50 is depicted, according to an embodiment of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
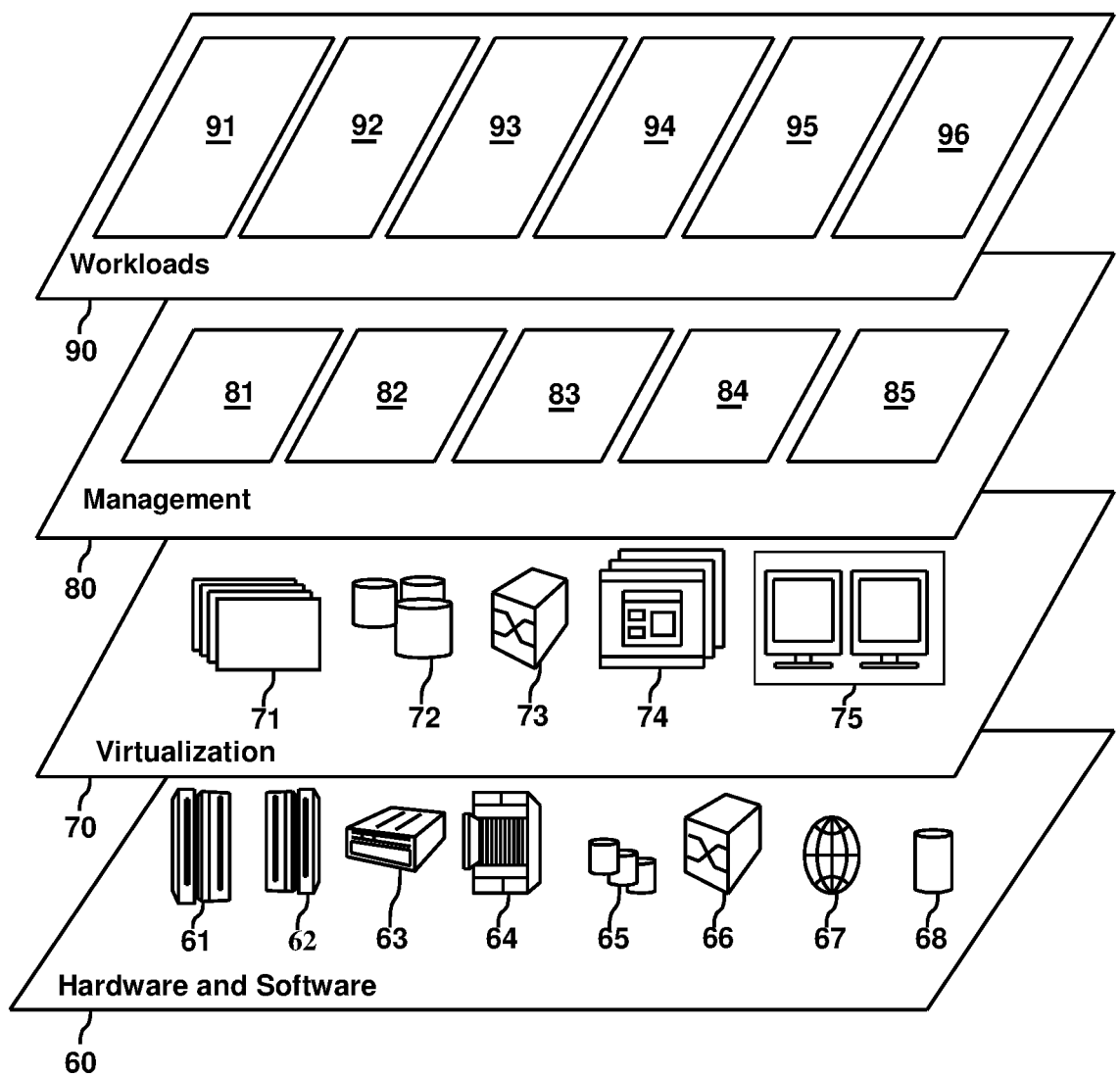
FIG. 3 depicts abstraction model layers, according to an embodiment of the present invention.

Referring now to FIG. 3, a set of functional abstraction layers provided by cloud computing environment 50 (FIG. 2) is shown, according to an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service assistance 96. The functionalities of service assistance will be described in the following embodiment of the present disclosure.

Figure 4:
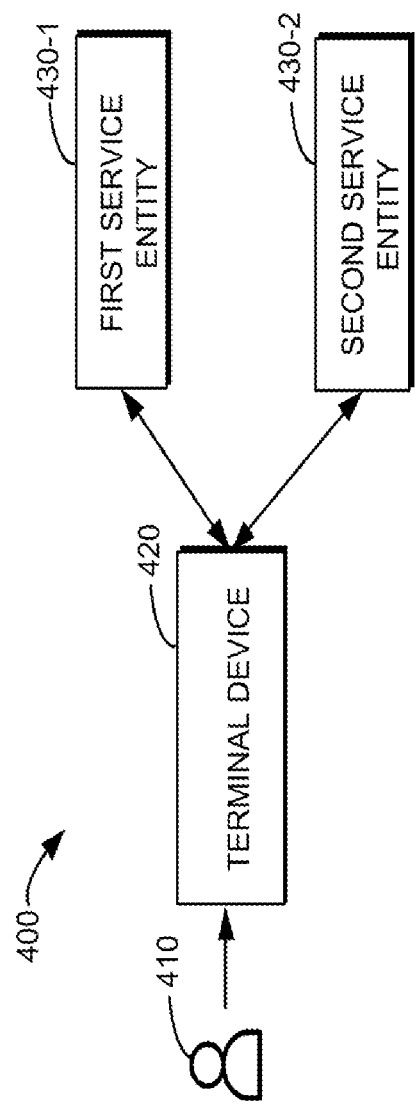
FIG. 4 depicts a schematic diagram of a conventional system for service provision, according to an embodiment of the present invention.

Referring now to FIG. 4, a conventional system 400 for service provision is shown, according to an embodiment of the present invention. As shown, a user 410 can obtain service provision from either or both of a first service entity 430-1 and a second service entity 430-2 via a terminal device 420. The first service entity 430-1 and the second service entity 430-2 may provision services in any manner to provide information to the user 410 in response to requests initiated by the user 410 through the terminal device 420.

In some cases, the user 410 may first initiate a session with the first service entity 430-1 to request a desired information, for example, through the terminal device 420. If the user 410 is not satisfied with the information output or provided by the first service entity 430-1, he/she may switch to the second service entity 430-2 for further help. At this time, the user 410 may have to start over from scratch to interact with the second service entity 430-2 to let the service entity 430-2 understand his/her intentions and provide the service accordingly. One typical example is turning to a call center for help from a human representative of an organization if the user cannot find a desired information by searching at a portal website of the organization. In this example, the user 410 may have to repeat his/her questions, and describe the background again to the call center. Sometimes the call center may transfer the user 410 to a right representative (e.g., a representative selected according to the user 410 needs) after several rounds of interaction that allowed determining the area in which the user 410 is actually interested or requires information. This may increase the time for the user to retrieve useful information or obtain help, and cause unnecessary processing within the service entity.

In another example, the user 410 may continue interacting with the first service entity 430-1 or the second service entity 430-2 after a period of time since the last interaction. A service entity generally provides information response according to input information provided by the user. The same information response will be processed as being corresponding to the same output information. Thus, the first service entity 430-1 or the second service entity 430-2 always responds in the same way to the same input information from the user 410, no matter how the user 410 interacted previously with this service entity, thereby lacking customization with respect to the user.

Embodiments of the present disclosure relate to the field of computer science, and more specifically, to a method, system and computer program product for assistance in service provision. To facilitate service provision, assistance information is determined based on a historical interaction information of a user with an entity provisioning a service. The assistance information associated with the user may indicate input information provided by the user and/or a preference of the user. The assistance information can be used to assist the same or a different service entity in provisioning the same or different service in response to a request from the user. With the assistance information, it is possible to improve efficiency of service provision and/or provide more desired information to the user.

Therefore, embodiments of the present disclosure may improve the technical field of computer science by provisioning an instantiation of a service to the user according to an assistance information indicating user preference(s) derived from a history of interactions between the user and one or more service entities. This may allow delivering a customized result according to the user preference(s) via data analysis of a feedback history and context. The proposed method, system and computer program product may provide a cognitive assistant that help users solving a specific problem or finding information about topics of interests.

The term "user preference" generally relates to a specification, an interest, or a natural inclination of the user(s) towards a determined option or choice. Examples of user preferences may include, but are not limited to, an area or topic of interest, a language, a time zone, an age group, a professional community, an employer, or a geographical location.

Figure 5:
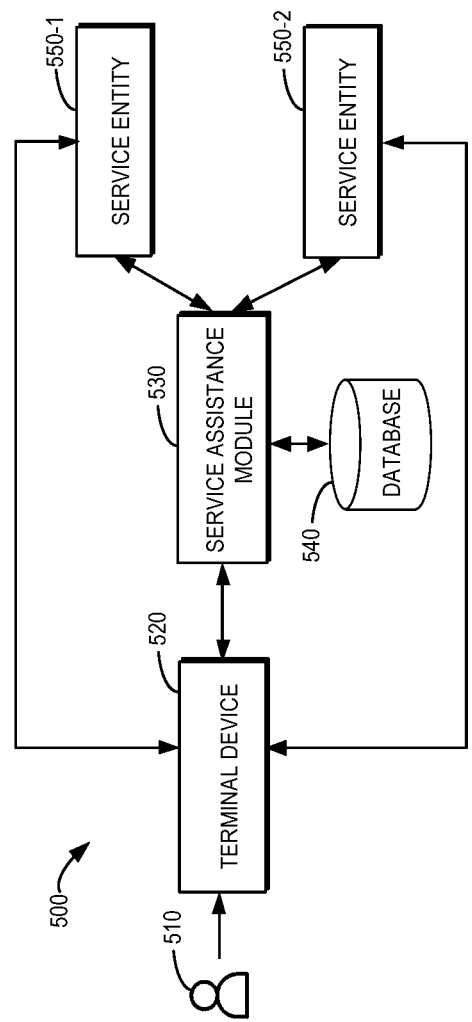
FIG. 5 depicts a schematic diagram of a system with assistance in service provision, according to an embodiment of the present invention.

Referring now to FIG. 5, a schematic diagram of a system 500 with assistance in service provision is shown, according to an embodiment of the present invention. As shown, a user 510 can obtain service provision from one or more service entities, including a service entity 550-1 and a service entity 550-2, through a terminal device 520. For purpose of discussion, the service entities 550-1 and 550-2 are collectively or individually referred to as service entities 550. Each of the service entities 550 may provision services in any manner to provide information to the user 510 in response to requests initiated by the user 510 through the terminal device 520.

It is to be understood that the number of service entities and terminal devices is only for the purpose of illustration without suggesting any limitations. The system 500 may include any suitable number of service entities and terminal devices adapted for implementing embodiments of the present disclosure. The user 510 may access to the service entity/entities via more than one terminal device, and one or more other users may obtain service provision from the service entities via their own terminal devices.

The terminal device 520 and the service entities 550 may communicate one another via wireless, wired (or cabled) and/or Internet-web based connections. The terminal device 520 may be any end device that may be capable of communication and computing. By way of example rather than limitation, a terminal device may include a mobile phone, a smart phone, a cellular phone, wireless local loop phones, a tablet, a laptop or handheld computer, a wearable terminal device, a personal digital assistant (PDA), a portable computer, a desktop computer, an image capture terminal device such as a digital camera, a gaming terminal device, music storage and a playback appliance, a vehicle-mounted wireless terminal device, and the like. The service entity 550 may be implemented by one or more physical or virtual computing devices, a service module/function implemented on a computing device, a server, a computing mainframe, and/or the like.

The service entities 550 may provision the same, similar, or different services. These services are capable of providing related information to the user 510 in an interactive manner with the user 510, for example, through the terminal device 520. Such services may sometimes be referred to as query-response services. The terminal device 520 may be installed with an application or software as a client for the user 510 to use the service.

In some embodiments, the provisioned service may include a search service. The search service may provide a search result as a response to a search query initiated from the user 510. The search result includes output information/content related to one or more keywords in the search query. The service entity 550 provisioning the search service may also be referred to as a search engine, which may be a general purpose web search engine or an embedded search engine inside each individual website. These websites may include a public website, a company website, common public forums and blogs, and/or any other websites.

In some embodiments, a provisioned service may include a chat-based service. The chat-based service provides answers to questions of the user 510 through one or more conversational iterations. As an example, the chat-based service may be provisioned automatically, for example, by a Chatbot and thus may be referred to as an automated chat service. In another example, the chat-based service may be provided with assistance of a human, and thus may be referred to as a human-assisted chat service. Through the human-assisted chat service, a text-based or voice-based conversation may be established between the user 510 and a human representative. One typical example of the human-assisted chat service is a call center or a service support center where a number of representatives may be employed to interact with customers to provide services, e.g., answers to inquiries, via phone calls and/or via on-line text chatting.

In the system 500, there is provided a service assistance module 530 between the terminal device 520 and the service entities 550, which may also be referred to as a service assistance engine, device, or system. The service assistance module 530 may be in wireless, wired (or cabled) and/or Internet-web based connections with the terminal device 520 and the service entities 550. According to embodiments of the present disclosure, the service assistance module 530 is configured to provide assistance information associated with the user 510 to the service entity 550-1 or the service entity 550-2 to assist the corresponding service entity in provisioning a service to the user 510. The service assistance module 530 may provide the assistance information proactively or in response to a request for providing such information from either the service entity 550 or the terminal device 520. The assistance information indicates at least a user preference(s) derived from interaction information of the user 510 with one or more service entities 550. The assistance information may be stored in a database 540 accessible by the service assistance module 530.

In some embodiments, the service assistance module 530 may be implemented by one or more physical or virtual computing devices, a service module/function implemented on a computing device, a server, a computing mainframe, and/or the like. In some embodiments, the service assistance module 530 may be implemented within the terminal device 520, within one or more service entities 550, or implemented by one or more other separate devices/entities.

The service assistance module, according to the embodiments of the present disclosure, will be described in detail below.

Figure 6:
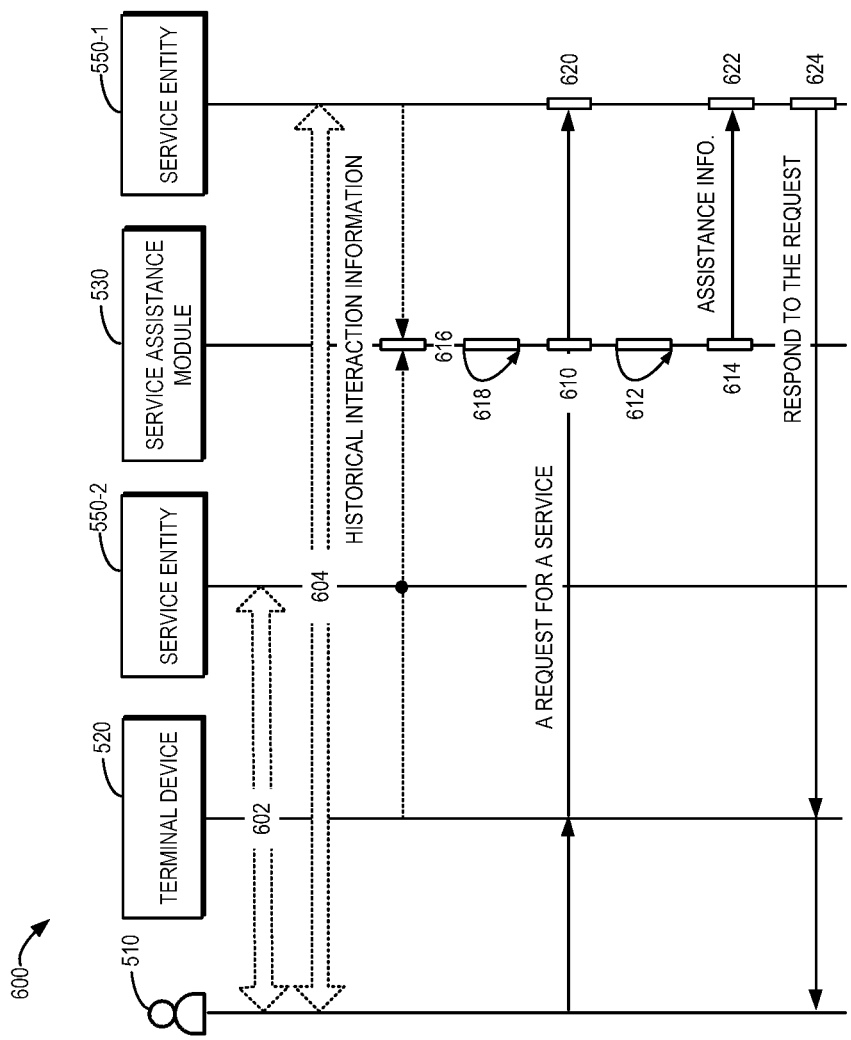
FIG. 6 depicts a flowchart of a process for assistance in service provision, according to an embodiment of the present invention.

Referring now to FIG. 6, a flowchart of a process for service assistance 600 is shown, according to an embodiment of the present invention. For the purpose of discussion, the process 600 will be described with reference to FIG. 5. The process 600 may involve the service assistance module 530, one or more service entities 550, the terminal device 520, and the user 510 in FIG. 5. In this embodiment, the service assistance module 530 provides assistance to the service entity 550-1. However, it would be appreciated that the service entity 550-2 may similarly obtain assistance from the service assistance module 530.

The service assistance module 530 detects, at 610, a request initiated by the terminal device 520 for a service to be provisioned by the service entity 550-1. This request is initiated by the user 510 through the terminal device 520. The service entity 550-1 receives, at 620, the request initiated by the terminal device 520. The service assistance module 530 may be notified of the request initiation by either the terminal device 520 or the service entity 550-1. For example, the service entity 550-1 may invoke the service assistance module 530 to provide some service assistance by notifying the service assistance module 530 of such a request for the service. The request initiation may also be detected by the service assistance module 530 in other ways, for example, by monitoring a message flow of the terminal device 520 or the service entity 550-1 and/or by other means. The scope of the present disclosure is not limited in these regards.

If the request is detected, the service assistance module 530 obtains at 612 assistance information associated with the user 510 of the terminal device 520. The assistance information may be predetermined and stored, for example, in the database 540 accessible by the service assistance module 530. The assistance information is determined based on historical interaction information of the user 510 with one or more service entities such as the service entity 550-2 or the service entity 550-1. That is, the service assistance is achieved by considering previous interactions between the user 510 and the service entity that is the same as or different from the one to which the request is initiated.

The assistance information based on historical interaction with the same service entity may improve and customize service provision, especially the output provided by the service entity according to the historical behavior of the user.

The assistance information based on historical interaction with a different service entity may enable the different service entity to have background of the user in current service provision, which may improve the service efficiency of that entity and reduce redundant information input required from the user.

The historical interaction information may include information related to one or more user behaviors/actions performed during provisioning of the service(s) by the service entity 550-2 and/or the service entity 550-1. The historical interaction information may be obtained by monitoring the terminal device 520, the service entity 550-2, and/or the service entity 550-1. The determination of the assistance information may be performed by the service assistance module 530 and is also illustrated in the process 600 of FIG. 6.

As shown, in response to provisioning, at 602, of the service by the service entity 550-2 to the user 501 and/or provisioning, at 604, of the service by the service entity 550-1 to the user 501, the service assistance module 530 may collect at 616 the historical interaction information from the terminal device 520, the service entity 550-2, and/or the service entity 550-1. The service assistance module 530 may determine at 618 the assistance information based on the collected historical interaction information. In other embodiments, the assistance information may also be determined in a separate device or module and then provides for the service assistance module 530 for use. In this case, the operations at 616 and 618 may be omitted from the service assistance module 530.

For a service entity 550 in concern, historical interaction information for one or more sessions between the user 510 and this service entity 550 may be captured. In some embodiments, the historical interaction information may always be captured during the service provision. The interaction information obtained more recently may have a larger weight and a greater impact on the assistance information than the interaction information obtained earlier.

In some embodiments, in the initial service provision for the user 510, there may be no assistance information created for the user 510. If the service assistance module 530 determines that the user 510 is a new user and no assistance information is created, it may instruct the assistance information to be created based on interaction information obtained in current service provision. The creation of the assistance information may be performed by either the service assistance module 530 or any other devices. In the following service provision, the service assistance module 530 may instruct the created assistance information to be updated based on the following interaction information.

The assistance information may be stored as a profile for the user 510. In some embodiments, the assistance information may be stored in association with an identifier of the user 510. The identifier may uniquely identify the user 510 and/or the terminal device 520 associated with the user 510. For example, the identifier may be a user account, an IP address of the terminal device 520, an identifier of a subscriber identification module inserted in the terminal device 520, a device model, and/or the like. The scope of the present disclosure is not limited in this regard.

Generally, during the provisioning at 602 and/or 604, corresponding output information may be provided and presented to the user 510. For example, a search request may be returned by a search service to the user 510 in response to one or more queries or questions of the user 510. One or more corresponding answers may also be output by a chat-based service if the user 510 asks one or more questions. More time spent and/or special operations performed on output information provided during the service provision may reflect the user preference.

Thus, to collect the historical interaction information, the service assistance module 530 may monitor time allocation of the user 510 in browsing different portions of the output information and/or different speeds of the user 510 in browsing different portions of the output information. Here, portions of the output information may be obtained by dividing the output information in any granularity. For example, a portion of the output information may correspond to a webpage, a segment of a webpage, an answer, and/or a specific portion of the answer. If the user 510 spends more time in reading a certain portion or reads it in a slower speed, it may indicate that the user 510 may have more interest in this portion of information or similar information.

In some embodiments, the user 510 may be allowed to interact with the output information through the terminal device 520, to perform one or more operations on different portions of the output information. Such operations may include but are not limited to sharing, liking, commenting, collecting, adding a bookmark, capturing a screenshot, and/or the like. Corresponding options related to these operations may be presented on the terminal device 520 for the user 510 to be selected. Through the operations, it is also possible to determine whether the user 510 likes or has an interest in one or more portions of the output information.

In addition to observing the user behavior(s) on the output information or as an alternative, the service assistance module 530 may also obtain input information directly provided by the user 510 during the provisioning 602 and/or provisioning 604, as the historical interaction information. Such input information may also implicitly or explicitly reflect which aspect of information the user 510 is interested in. In some embodiments, the user 510 may have multiple attempts on giving the input information, trying to refine and locate the useful information. The change of the input information may also be recorded as the historical interaction information. For example, if a user wants to understand how the tax is applied in his salary, he may probably search in an internal web site of his company with different keywords such as salary tax, pay roll tax, wage tax, and the like. A collection of these search attempts may be useful for determining the user's intention.

The service assistance module 530 may analyze the historical interaction information in a cognition-aware manner to obtain the assistance information. In some embodiments, one or more preferences of the user 510 may be derived from the historical interaction information and included in the assistance information. In some embodiments, the assistance information may also include original input information provided by the user 510 for the service.

A user preference may indicate user intention in the service that has been provisioned, which is hidden from the explicit information input by the user but can be analyzed and captured from his/her interactions. The user preference is generally invisible to the user 510 but can be applied to influence the service provision of the service entities. The service assistance module 530 may employ various techniques such as information analysis, pattern analysis, machine learning and/or the like to analyze the historical interaction information and then determine the user preferences.

In an embodiment, a user preference may indicate a subject area in which the user 510 is interested, and that may be used to encourage the service entity 550-1 to provide the requested service in a way that matches or correlates with the subject area. For example, if the user 510 provides input information related to a broad concept, the user preference may indicate a more specific area under the broad concept. The subject area preferred by the user 510 may be indicated for example by specifying customized criteria for service provision. For example, the user preference may be indicated as a specification on search criteria to be applied by a search service or as a target type and/or area of information the user 510 is probably interested in.

The determination of the assistance information has been described above. Still referring to FIG. 6, in the case of detecting the request for the service to be provisioned by the service entity 550-1, the service assistance module 530 provides at 614 the assistance information to the service entity 550-1, for example, via a communication connection therebetween. After obtaining, at 622, the assistance information from the service assistance module 530, the service entity 550-1 responds at 624 to the request by provisioning the service based on the assistance information. The response may be provided to the terminal device 520, and then to the user 510.

In some embodiments, if the service entity 550-1 is configured to output information in response to a query or question from the user 510, the assistance information may be used by the service entity 550-1 to provide customized output information to the user 510. In a general principle, the service entity 550-1 responds to the user's query or question based on input information provided from the user(s) by following a predetermined information response policy that is applied to all the users. Thus, no matter who provide the same input information, the same output information may be provided by following the predetermined information response policy. In the embodiments of the present disclosure, by use of the assistance information associated with the user 510, the service entity 550-1 may customize and refine the output information for the user 510. As such, the information that is preferred by the user 510 may be more likely to be presented and/or highlight (for example, by a higher rank) in the output information.

As a specific example, it is assumed that the service entity 550-1 is configured to provision a search service. The assistance information may be determined from historical interaction information obtained during previous provisioning of the search service and/or the chat-based service. The service entity 550-1 may further customize and refine the search result that is related to a specific subject area indicated by the user preference in the assistance information. Thus, the user 510 can be provided with a more accurate search result.

In some embodiments, the service to be provisioned by the service entity 550-1 may include a plurality of service channels related to different service domains. In each service domain, limited information may be provided. A typical example is the call center where the representatives are grouped into different classes, each having knowledge or expertise experiences to answer questions in certain subject areas. The assistance information may be used to locate the service channel that is more likely preferred by the user 510. The service entity 550-1 may then direct the request of the user 510 to one of the plurality of the service channels based on the assistance information. For example, if the assistance information indicates that the user 510 is more interested in searching for rate information of a subscription, the service entity 550-1 may direct the request to the service channel, such as a human representative that is responsive for the rate of the subscription. In some embodiments, the assistance information may be presented by the service entity 550-1 to the representative to provide more context and background about this user 510.

As a specific example, it is assumed that the service entity 550-1 is configured to provision a chat-based service where different Chatbots or different human representatives are responsible for answering questions in certain subject areas. The user 510 may switch from another type of service to look for continued information response by the service entity 550-1. By means of the assistance information, the user 510 may be directly connected to the right Chatbot or human representative to respond to the request of the user 510, such as a call request or a chatting request. As compared with a convention solution where the call center has no background about the user 510, the assistance information can improve the provisioning efficiency of the service entity and reduce cost for the entity to transfer the request among different service channels. In addition, it is also possible to reduce the time for the user to repeat his/her intentions and background to the service entity in the case of service switch.

Figure 7:
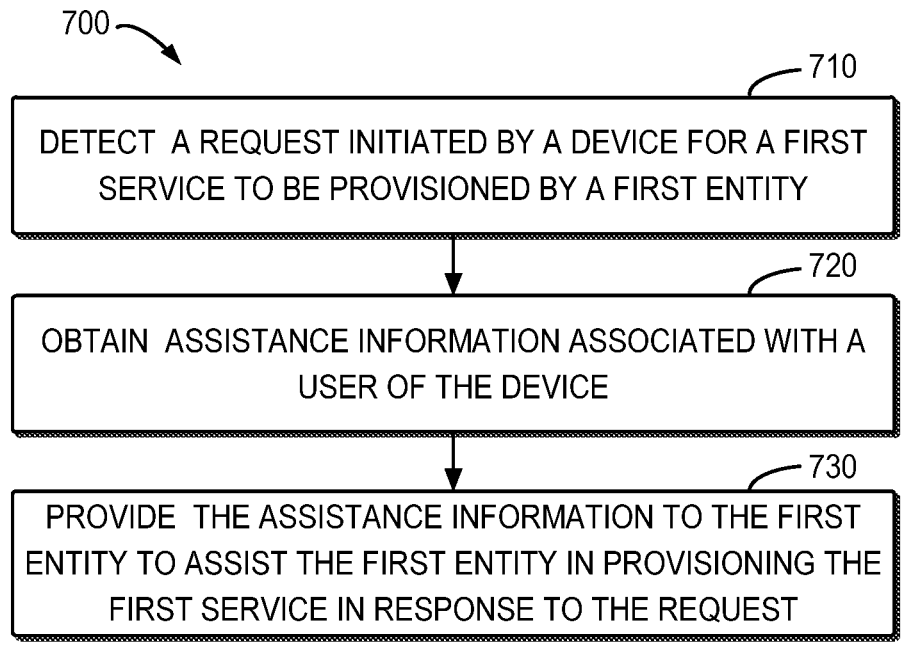
FIG. 7 depicts a flowchart of a method implemented at a service assistance module, according to an embodiment of the present invention.

Referring now to FIG. 7, a flowchart of an example method 700 is shown, according to an embodiment of the present invention. The method 700 can be implemented at a service assistance module 530 as shown in FIG. 5. For the purpose of discussion, the method 700 will be described from the perspective of the service assistance module 530 with reference to FIG. 5.

At block 710, the service assistance module 530 detects a request initiated by a device for a first service to be provisioned by a first entity. The first entity may be the service entity 550-1 in FIG. 5. At block 720, the service assistance module 530 obtains, in response to detecting the request, assistance information associated with a user of the device. The assistance information indicates at least a user preference, and the user preference is derived from historical interaction information of the user with a second entity provisioning a second service. The second entity may be the service entity 550-2 or the same service entity 550-1 in FIG. 5. At block 730, the service assistance module 530 provides the assistance information to the first entity to assist the first entity in provisioning the first service in response to the request.

In some embodiments, at least one of the first and second services includes at least one of a search service, an automated chat service, and a human-assisted chat service.

In some embodiments, the historical interaction information includes at least one of the following: input information provided by the user to the second entity; time allocation of the user in browsing different portions of output information provided by the second entity; a speed of the user in browsing a portion of the output information provided by the second entity; and at least one operation performed by the user on a part of the output information provided by the second entity.

In some embodiments, the method 700 further includes, in response to detecting that the second service is provisioned for the user, determining, by one or more processors, whether the assistance information is created for the user; in response to absence of the assistance information, instructing, by one or more processors, the assistance information to be created based on historical interaction information collected during the provisioning of the second service; in response to the assistance information being created, instructing, by one or more processors, the assistance information to be updated based on the historical interaction information; and storing, by one or more processors, the assistance information in association with an identifier of the user.

In some embodiments, the providing of the assistance information includes: providing the assistance information for the first entity to assist the first entity in providing customized output information for the user based on the assistance information, as a response to the request.

In some embodiments, the first service includes a plurality of service channels related to different service domains. In some embodiments, the providing of the assistance information includes: providing, by one or more processors, the assistance information for the first entity to assist the first entity in directing the request to one of the plurality of the service channels.

In some embodiments, the assistance information further indicates input information provided by the user to the second entity, and the user preference indicates at least a subject area related to the input information which the user is interested in.

Figure 8:
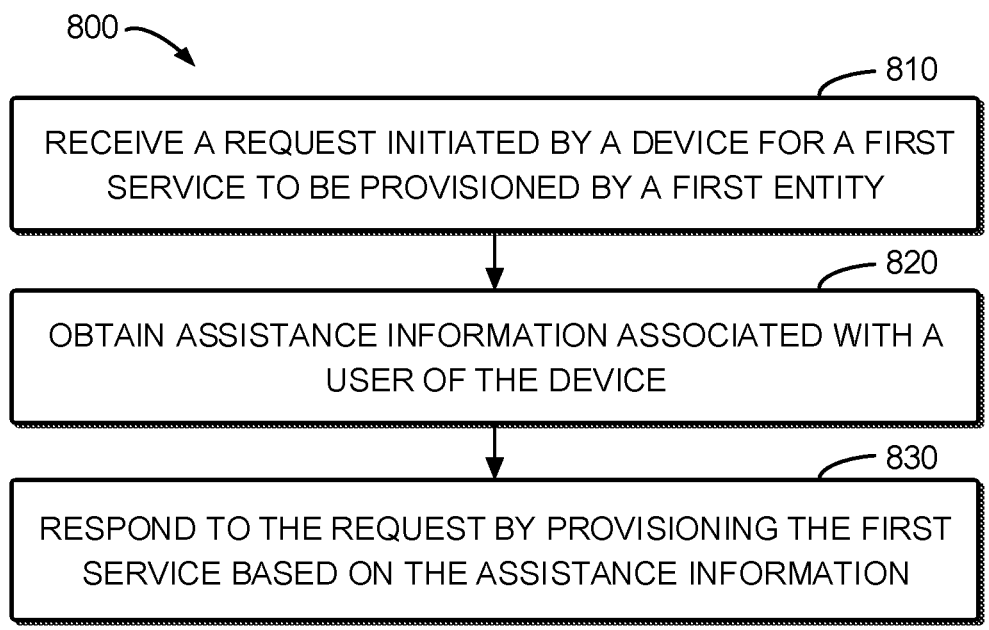
FIG. 8 depicts a flowchart of a method implemented at a service entity, according to an embodiment of the present invention.

Referring now to FIG. 8, a flowchart of an example method 800, is shown, according to an embodiment of the present invention. The method 800 can be implemented at a service entity 550 as shown in FIG. 5. For the purpose of discussion, the method 800 will be described from the perspective of the service assistance module 530 with reference to FIG. 5.

At block 810, the service entity 550 receives a request initiated by a device for a first service to be provisioned. At block 820, the service entity 550 obtains assistance information associated with a user of the device. The assistance information indicates at least a user preference, and the user preference is derived from historical interaction information of the user with a second entity provisioning a second service. The second entity may be the service entity 550-2 or the same service entity 550-1 in FIG. 5. At block 830, the service entity 550 responds to the request by provisioning the first service based on the assistance information.

In some embodiments, at least one of the first and second services includes at least one of a search service, an automated chat service, and a human-assisted chat service.

In some embodiments, the responding to the request includes: providing, by one or more processors, customized output information for the user based on the assistance information and input information provided by the user to the service entity 550.

In some embodiments, the first service includes a plurality of service channels related to different service domains, and where the responding to the request includes: directing, by one or more processors, the request to one of the plurality of the service channels based on the assistance information.

In some embodiments, the assistance information further indicates input information provided by the user to the second entity, and the user preference indicates at least a subject area related to the input information which the user is interested in.

It should be noted that the processing of assistance in service provision according to embodiments of this disclosure could be implemented by computer system/server 12 of FIG. 1.

According to an embodiment of the present disclosure, a method for service provision includes detecting, by one or more processors, a request initiated by a device for a first service to be provisioned by a first entity, in response to detecting the request, obtaining, by one or more processors, assistance information associated with a user of the device, the assistance information indicating at least a user preference, the user preference being derived from historical interaction information of the user with a second entity provisioning a second service, and providing, by one or more processors, the assistance information to the first entity to assist the first entity in provisioning the first service in response to the request. In this embodiment, at least one of the first and second services includes at least one of a search service, an automated chat service, and a human-assisted chat service, and the historical interaction information includes at least one of the following: input information provided by the user to the second entity, time allocation of the user in browsing different portions of output information provided by the second entity, a speed of the user in browsing a portion of the output information provided by the second entity, and at least one operation performed by the user on a part of the output information provided by the second entity.

The method further includes in response to detecting that the second service is provisioned for the user, determining, by one or more processors, whether the assistance information is created for the user, in response to absence of the assistance information, instructing, by one or more processors, the assistance information to be created based on historical interaction information collected during the provisioning of the second service, in response to the assistance information being created, instructing, by one or more processors, the assistance information to be updated based on the historical interaction information, and storing, by one or more processors, the assistance information in association with an identifier of the user. In this embodiment, the providing of the assistance information includes providing, by one or more processors, the assistance information for the first entity to assist the first entity in providing customized output information for the user based on the assistance information, as a response to the request. The first service includes a plurality of service channels related to different service domains, and wherein the providing of the assistance information includes: providing, by one or more processors, the assistance information for the first entity to assist the first entity in directing the request to one of the plurality of the service channels. The assistance information further indicates input information provided by the user to the second entity, and the user preference indicates at least a subject area related to the input information which the user is interested in.

According to another embodiment of the present disclosure, a method for service provision includes receiving, by one or more processors, a request initiated by a device for a first service to be provisioned by a first entity, obtaining assistance information associated with a user of the device, the assistance information indicating at least a user preference, the user preference being derived from historical interaction information of the user with a second entity provisioning a second service, and responding to the request by provisioning the first service based on the assistance information. At least one of the first and second services includes at least one of a search service, an automated chat service, and a human-assisted chat service. In this embodiment, the responding to the request includes: providing, by one or more processors, customized output information for the user based on the assistance information and input information provided by the user to the first entity. The first service includes a plurality of service channels related to different service domains, and the responding to the request includes: directing, by one or more processors, the request to one of the plurality of the service channels based on the assistance information. The assistance information further indicates input information provided by the user to the second entity, and the user preference indicates at least a subject area related to the input information which the user is interested in.

According to another embodiment, a system for service provision includes a processing unit, and a memory coupled to the processing unit and storing instructions thereon, the instructions, when executed by the processing unit, performing acts including: detecting, by one or more processors, a request initiated by a device for a first service to be provisioned by a first entity, in response to detecting the request, obtaining, by one or more processors, assistance information associated with a user of the device, the assistance information indicating at least a user preference, the user preference being derived from historical interaction information of the user with a second entity provisioning a second service, and providing, by one or more processors, the assistance information to the first entity to assist the first entity in provisioning the first service in response to the request. At least one of the first and second services includes at least one of a search service, an automated chat service, and a human-assisted chat service. The historical interaction information includes at least one of the following: input information provided by the user to the second entity, time allocation of the user in browsing different portions of output information provided by the second entity, a speed of the user in browsing a portion of the output information provided by the second entity, and at least one operation performed by the user on a part of the output information provided by the second entity. In this embodiment, the system further includes: in response to detecting that the second service is provisioned for the user, determining, by one or more processors, whether the assistance information is created for the user, in response to absence of the assistance information, instructing, by one or more processors, the assistance information to be created based on historical interaction information collected during the provisioning of the second service, in response to the assistance information being created, instructing, by one or more processors, the assistance information to be updated based on the historical interaction information, and storing, by one or more processors, the assistance information in association with an identifier of the user. The first service includes a plurality of service channels related to different service domains, and the providing of the assistance information includes: providing, by one or more processors, the assistance information for the first entity to assist the first entity in directing the request to one of the plurality of the service channels.

According to another embodiment, a system for service provision includes a processing unit, and a memory coupled to the processing unit and storing instructions thereon, the instructions, when executed by the processing unit, performing acts including: receiving, by one or more processors, a request initiated by a device for a first service to be provisioned by a first entity, obtaining assistance information associated with a user of the device, the assistance information indicating at least a user preference, the user preference being derived from historical interaction information of the user with a second entity provisioning a second service, and responding to the request by provisioning the first service based on the assistance information.

According to another embodiment, a computer program product being tangibly stored on a non-transient machine-readable medium and comprising machine-executable instructions, the instruction, when executed on a device, causing the device to perform acts including: detecting, by one or more processors, a request initiated by a device for a first service to be provisioned by a first entity, in response to detecting the request, obtaining, by one or more processors, assistance information associated with a user of the device, the assistance information indicating at least a user preference, the user preference being derived from historical interaction information of the user with a second entity provisioning a second service; and providing, by one or more processors, the assistance information for the first entity to assist the first entity in provisioning the first service in response to the request.

According to yet another embodiment, a computer program product being tangibly stored on a non-transient machine-readable medium and including machine-executable instructions, the instruction, when executed on a device, causing the device to perform acts including: receiving, by one or more processors, a request initiated by a device for a first service to be provisioned by a first entity, obtaining assistance information associated with a user of the device, the assistance information indicating at least a user preference, the user preference being derived from historical interaction information of the user with a second entity provisioning a second service, and responding to the request by provisioning the first service based on the assistance information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The terms "one embodiment" and "an embodiment" are to be read as "at least one embodiment." The term "another embodiment" is to be read as "at least one other embodiment." The terms "first," "second," and the like may refer to different or same objects.

What is claimed is:

1. A method comprising performing at least the following operations by one or more processor(s):

receiving, by a first entity, a request initiated by a device of a first user for a first service to be provisioned by the first entity;

detecting, by a service assistance engine, the request initiation from the device by monitoring a message flow between the device and the first entity, the service assistance engine being communicatively connected to the device and communicatively connected to the first entity;

responsive to detecting the request, collecting, by the service assistance engine, historical interaction information between the first user and at least one of a second entity provisioning a second service and the first entity, the historical interaction information being analyzed by the service assistance engine to derive first user preference data, wherein the second entity is communicatively connected to the service assistance engine;

responsive to receiving the request, provisioning, by the first entity, an instantiation of the first service in a manner that is based, at least in part, on the first user preference data, the first service comprising output information selected based, at least in part, on the first user preference data;

storing, by the service assistance engine, the first user preference data as a profile for the first user in a database accessible by the service assistance engine;

receiving, by the device, an input from the first user via one or more operations performed on the output information comprised in the first service, the one or more operations including at least one of sharing, liking, commenting, collecting, adding a bookmark and capturing a screenshot;

monitoring, by the service assistance engine, a time allocated by the first user to browse different portions of the output information comprised in the first service provided by the first entity and an associated browsing speed; and based on the monitoring and the input information provided by the first user, updating, by the service assistance engine, the historical interaction information of the first user, wherein a weight of the updated historical interaction information is larger than a weight of previously collected historical interaction information for deriving the first user preference data and provisioning the first service.

2. The method of claim 1, wherein at least one of the first and second services comprises at least one of a search service, an automated chat service, and a human-assisted chat service.

3. The method of claim 1, wherein the historical interaction information comprises at least one of the following:
input information provided by the first user to the second entity;
time allocation of the first user in browsing different portions of output information provided by the second entity;
a speed of the first user in browsing a portion of the output information provided by the second entity; and
at least one operation performed by the first user on a part of the output information provided by the second entity.

4. The method of claim 1, further comprising:
responsive to detecting that the second service is provisioned to the first user, determining, by the one or more processors, whether the first user preference data is created for the first user;
in response to the first user preference data not being created, instructing, by the one or more processors, the first user preference data to be created based on the historical interaction information collected during the provisioning of the second service;
in response to the first user preference data being created, instructing, by the one or more processors, the first user preference data to be updated based on the historical interaction information; and
storing, by the one or more processors, the first user preference data in association with an identifier of the first user.

5. The method of claim 1, further comprising:
providing, by one or more processors, the first user preference data to assist the first entity in providing customized output information for the first user based on the first user preference data, as a response to the request.

6. The method of claim 1, wherein the first service comprises a plurality of service channels related to different service domains, and wherein the provisioning the instantiation of the first service comprises:

providing, by one or more processors, the first user preference data to assist the first entity in directing the request to one of the plurality of the service channels.

7. The method of claim 1, wherein the first user preference data further comprises an input information provided by the first user to the second entity including at least a subject area related to the input information in which the first user is interested.

8. A computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by a first entity, a request initiated by a device of a first user for a first service to be provisioned by the first entity;

detecting, by a service assistance engine, the request initiation from the device by monitoring a message flow between the device and the first entity, the service assistance engine being communicatively connected to the device and communicatively connected to the first entity;

responsive to detecting the request, collecting, by the service assistance engine, historical interaction information between the first user and at least one of a second entity provisioning a second service and the first entity, the historical interaction information being analyzed by the service assistance engine to derive first user preference data, wherein the second entity is communicatively connected to the service assistance engine;

responsive to receiving the request, provisioning, by the first entity, an instantiation of the first service in a manner that is based, at least in part, on the first user preference data, the first service comprising output information selected based, at least in part, on the first user preference data;

storing, by the service assistance engine, the first user preference data as a profile for the first user in a database accessible by the service assistance engine;

receiving, by the device, an input from the first user via one or more operations performed on the output information comprised in the first service, the one or more operations including at least one of sharing, liking, commenting, collecting, adding a bookmark and capturing a screenshot;

monitoring, by the service assistance engine, a time allocated by the first user to browse different portions of the output information comprised in the first service provided by the first entity and an associated browsing speed; and based on the monitoring and the input information provided by the first user, updating, by the service assistance engine, the historical interaction information of the first user, wherein a weight of the updated historical interaction information is larger than a weight of previously collected historical interaction information for deriving the first user preference data and provisioning the first service.

9. The computer system of claim 8, wherein at least one of the first and second services comprises at least one of a search service, an automated chat service, and a human-assisted chat service.

10. The computer system of claim 8, wherein the historical interaction information comprises at least one of the following:
  input information provided by the first user to the second entity;
  time allocation of the first user in browsing different portions of output information provided by the second entity;
  a speed of the first user in browsing a portion of the output information provided by the second entity; and
  at least one operation performed by the first user on a part of the output information provided by the second entity.

11. The computer system of claim 8, further comprising:
  responsive to detecting that the second service is provisioned to the first user, determining, by the one or more processors, whether the first user preference data is created for the first user;
  in response to the first user preference data not being created, instructing, by the one or more processors, the first user preference data to be created based on the historical interaction information collected during the provisioning of the second service;
  in response to the first user preference data being created, instructing, by the one or more processors, the first user preference data to be updated based on the historical interaction information; and
  storing, by the one or more processors, the first user preference data in association with an identifier of the first user.

12. The computer system of claim 8, further comprising:
  providing, by one or more processors, the first user preference data to assist the first entity in providing customized output information for the first user based on the first user preference data, as a response to the request.

13. The computer system of claim 8, wherein the first service comprises a plurality of service channels related to different service domains, and wherein the provisioning the instantiation of the first service comprises:
  providing, by one or more processors, the first user preference data to assist the first entity in directing the request to one of the plurality of the service channels.

14. The computer system of claim 8, wherein the first user preference data further comprises an input information provided by the first user to the second entity including at least a subject area related to the input information in which the first user is interested.

15. A computer program product comprising a computer readable non-transitory article of manufacture tangibly embodying computer readable instructions which, when executed, cause a computer to carry out a method comprising:
  receiving, by a first entity, a request initiated by a device of a first user for a first service to be provisioned by the first entity;
  detecting, by a service assistance engine, the request initiation from the device by monitoring a message flow between the device and the first entity, the service assistance engine being communicatively connected to the device and communicatively connected to the first entity;
  responsive to detecting the request, collecting, by the service assistance engine, historical interaction information between the first user and at least one of a second entity provisioning a second service and the first entity, the historical interaction information being analyzed by the service assistance engine to derive first user preference data, wherein the second entity is communicatively connected to the service assistance engine;
  responsive to receiving the request, provisioning, by the first entity, an instantiation of the first service in a manner that is based, at least in part, on the first user preference data, the first service comprising output information selected based, at least in part, on the first user preference data;
  storing, by the service assistance engine, the first user preference data as a profile for the first user in a database accessible by the service assistance engine;
  receiving, by the device, an input from the first user via one or more operations performed on the output information comprised in the first service, the one or more operations including at least one of sharing, liking, commenting, collecting, adding a bookmark and capturing a screenshot;
  monitoring, by the service assistance engine, a time allocated by the first user to browse different portions of the output information comprised in the first service provided by the first entity and an associated browsing speed; and
  based on the monitoring and the input information provided by the first user, updating, by the service assistance engine, the historical interaction information of the first user, wherein a weight of the updated historical interaction information is larger than a weight of previously collected historical interaction information for deriving the first user preference data and provisioning the first service.

16. The computer program product of claim 15, wherein at least one of the first and second services comprises at least one of a search service, an automated chat service, and a human-assisted chat service.

17. The computer program product of claim 15, wherein the historical interaction information comprises at least one of the following:
  input information provided by the first user to the second entity;
  time allocation of the first user in browsing different portions of output information provided by the second entity;
  a speed of the first user in browsing a portion of the output information provided by the second entity; and
  at least one operation performed by the first user on a part of the output information provided by the second entity.

18. The computer program product of claim 15, further comprising:
  responsive to detecting that the second service is provisioned to the first user, determining, by one or more processors, whether the first user preference data is created for the first user;
  in response to the first user preference data not being created, instructing, by the one or more processors, the first user preference data to be created based on the historical interaction information collected during the provisioning of the second service;
  in response to the first user preference data being created, instructing, by the one or more processors, the first user preference data to be updated based on the historical interaction information; and
  storing, by the one or more processors, the first user preference data in association with an identifier of the first user.

19. The computer program product of claim 15, further comprising:

providing, by one or more processors, the first user preference data to assist the first entity in providing customized output information for the first user based on the first user preference data, as a response to the request.

20. The computer program product of claim 15, wherein the first service comprises a plurality of service channels related to different service domains, and wherein the provisioning the instantiation of the first service comprises:

providing, by one or more processors, the first user preference data to assist the first entity in directing the request to one of the plurality of the service channels.

* * * * *